United States Patent [19]

Ritchie et al.

[11] 4,214,922
[45] Jul. 29, 1980

[54] CONVEYOR INSTALLATION AND METHOD FOR HANDLING WORKPIECES

[75] Inventors: Timothy J. Ritchie, Chillicothe; Ralph E. White, Peoria, both of Ill.

[73] Assignee: Caterpillar Tractor Co., Peoria, Ill.

[21] Appl. No.: 923,841

[22] Filed: Jul. 12, 1978

[51] Int. Cl.$^2$ .............................................. B23K 7/00
[52] U.S. Cl. ..................................... 148/9.5; 83/713; 148/9 R; 148/153; 266/48; 266/77; 271/275
[58] Field of Search ................... 266/48, 77; 271/275; 226/170; 219/121 P; 148/155, 9, 9.5, 153; 83/713

[56] References Cited

U.S. PATENT DOCUMENTS

| | | | |
|---|---|---|---|
| 3,599,946 | 8/1971 | Westeren et al. | 148/153 |
| 3,645,805 | 2/1972 | Hoffmann et al. | 148/153 |
| 3,720,544 | 3/1973 | Entringer | 148/153 |
| 3,743,259 | 7/1973 | Hennelly | 266/23 K |
| 3,744,776 | 7/1973 | Nyberg | 148/153 |
| 3,788,618 | 1/1974 | van den Bulcke | 148/153 |

Primary Examiner—L. Dewayne Rutledge
Assistant Examiner—John P. Sheehan
Attorney, Agent, or Firm—Phillips, Moore, Weissenberger, Lempio & Majestic

[57] ABSTRACT

An installation (10) for handling a workpiece $W_1$ including a first station (12) for loading a workpiece, a second station (14) for working on the workpiece, a third station (16) for unloading the workpiece, and a conveyor (18), extending in a closed loop about the first and second stations, for transporting the workpiece from the first to the second station. The conveyor is a track of the type used on earthmoving equipment such as tractors, and whose tension is adjustable by a hydraulic cylinder arrangement (26–32) to lower part of the conveyor into a water tank (50) at the second station for plasma-arc cutting the workpiece. The third station is adjacent the second station and has two additional conveyors (66, 68) for receiving a cut workpiece, depending on the size of such cut workpiece. A cleaning apparatus (60–64) supplies jets of water onto the closed loop conveyor to clean the latter of slag.

27 Claims, 5 Drawing Figures

CONVEYOR INSTALLATION AND METHOD FOR HANDLING WORKPIECES

TECHNICAL FIELD

This invention relates to a materials handling system and, more particularly, to an installation and method for handling workpieces which are to be cut.

BACKGROUND ART

Recently, advancement has been made in the field of shaping workpieces by a cutting process. This advancement has occurred through the use of plasma-arc cutting machines in which a workpiece is disposed beneath cutting torches of a plasma-arc cutting machine. A high energy plasma-arc produced by the machine is capable of cutting through the workpiece to form it into the desired shape.

An important advantage of the use of plasma-arc cutting machines is that they have high cutting speeds, while providing smooth, sharp edges on the cut workpiece.

The installation for plasma-arc cutting of the workpieces typically includes a single station at which a workpiece is first loaded on a table with a plasma-arc cutting machine suspended overhead. Then, the plasma-arc cutting machine is lowered towards the table to cut the workpiece, and then after the cutting operation, the plasma-arc machine is raised off the table and another workpiece brought onto the table.

DISCLOSURE OF THE INVENTION

In one aspect of the present invention, an installation is provided for handling a workpiece including a first station means for loading the workpiece, a second station means for working on the workpiece, a third station means for unloading the workpiece, and means for transporting the workpiece from the first station means to the second station means. The transporting means includes a conveyor which is movable about the first station means and the second station means. The third station means is adjacent the second station means so that the conveyor delivers the workpiece from the second station means to the third station means.

In another aspect of the present invention, a method of handling workpieces is provided in which one workpiece is loaded on the conveyor at a first station and the conveyor moved to transport the one workpiece to a second station. The conveyor is then stopped when the workpiece is at the second station and then lowered into a water tank. A tool is moved over the workpiece to operate on it, and after finishing the operation, the tool is removed from the workpiece. The conveyor is then removed from the water. While the one workpiece is on the conveyor at the second station, another workpiece is loaded on the conveyor at the first station. After the conveyor is removed from the water, it is moved to transport the one workpiece to a third station while transporting the other workpiece into the second station where it can be operated on in a similar manner.

The high speed cutting operation of plasma-arc cutting machines tends to increase production, however, a problem exists in prior installations in that full advantage, as yet, can not be taken of the increased cutting speed to improve production significantly. This is because the materials handling aspect involved in cutting the workpieces has not changed substantially from previous techniques. More particularly, while the workpiece can be cut rapidly, production is limited by the very time consuming operations of loading and unloading the workpiece at a single station and raising and lowering the plasma-arc torches. This materials handling problem prevents full utilization of the shorter cutting time provided by the plasma-arc cutting machine.

The installation and method of the present invention solves this problem of productivity. Among other advantages to be described, the present invention enables a more efficient handling of workpieces to increase productivity.

BEST MODE FOR CARRYING OUT THE INVENTION

Figure 1:
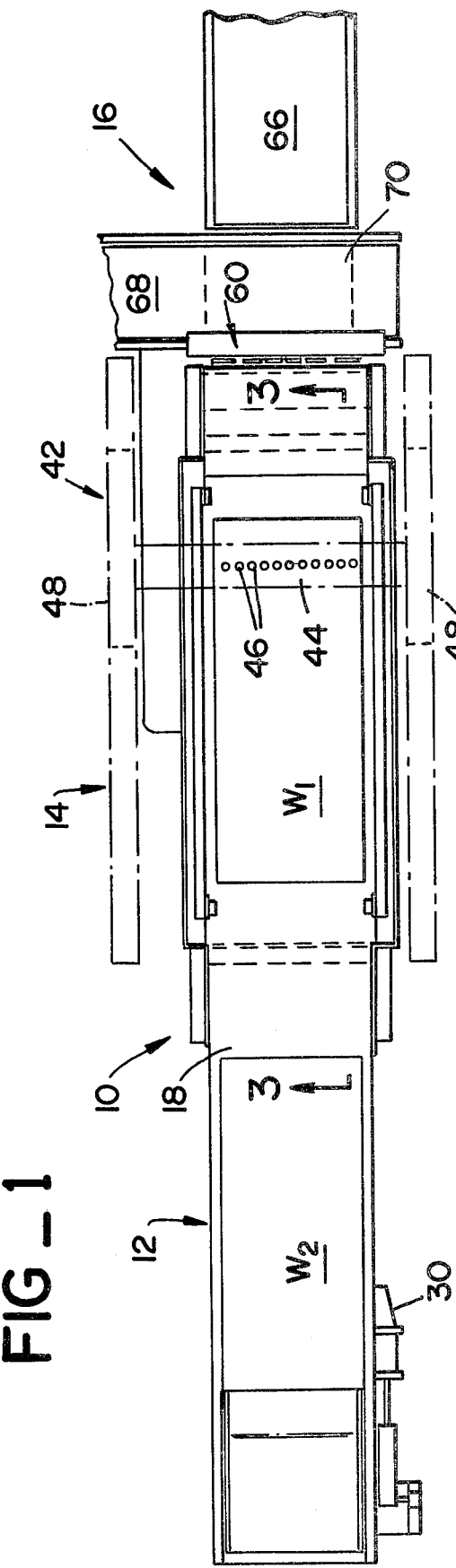
FIG. 1 is a top plan view of an embodiment of the installation of the present invention.
Figure 2:
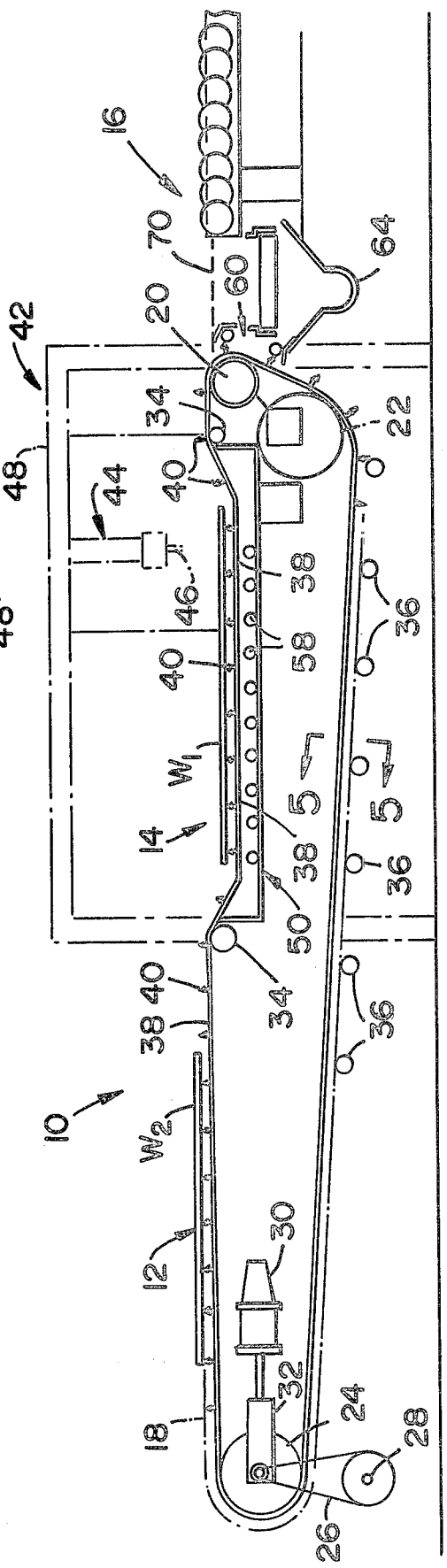
FIG. 2 is a side elevation of the installation of FIG. 1.

As shown in FIGS. 1 and 2, an installation 10 for handling workpieces includes three stations 12, 14 and 16. Work station 12 is a loading station in which a workpiece $W_2$ is loaded onto a conveyor 18. Station 14 is a work station in which a workpiece $W_1$, transported by conveyor 18 from station 12 to station 14, is worked on as desired. As may be appreciated, while workpiece $W_1$ is in work station 14, the workpiece $W_2$ can be loaded onto conveyor 18 at station 12. Station 16 is an unloading station in which the workpiece operated on at station 14 can be unloaded from the conveyor 18 for further handling as may be required.

The conveyor 18 extends in a closed loop about the loading station 12 and work station 14. A drive roller 20, at the work station 14, is coupled in a well-known manner to a drive motor (not shown) to drive the conveyor 18 in the closed loop. Conveyor 18 is guided about the loop by one idler roller 22 at work station 14 and another idler roller 24 at the loading station 12. The idler roller 24 is mounted on a support 26 which is rotatable about a pivot 28. A hydraulic cylinder 30 and cylinder rod 32, which is connected to the support 26, act to adjust the tension on the conveyor 18. When rod 32 is retracted into the cylinder 30, support 26 rotates in a clockwise direction so that the tension on the conveyor 18 decreases, while extension of the rod 32 from the cylinder 30 rotates support 26 in a counterclockwise direction to increase the tension on the conveyor. Two carrier rollers 34 support the upper portion of the conveyor 18 and additional carrier rollers 36 carry the lower portion of the conveyor 18 during the traversal of the latter about the loop.

Conveyor 18 is a track of the type used, for example, on earthworking equipment such as tractors. As shown in FIG. 2, and more clearly in FIGS. 3–5, the conveyor or track 18 includes a plurality of track shoes 38, which are linked together in a well-known manner, and a plurality of grouser bars 40, there being one grouser bar 40 extending from each shoe 38. The workpiece $W_1$ or $W_2$ is supported above shoes 38 on the bars 40.

At the work station 14, as shown in FIGS. 1 and 2, a cutting machine 42 may be used to cut the workpiece $W_1$ into desired shapes, such as strips. This machine 42 may comprise a plasma-arc cutting tool 44 having a plurality of cutting torches 46 which cut the workpiece $W_1$. The tool 44 is supported on a gantry 48 which has rails (not shown) along which the tool 44 can be lowered into position to cut the workpiece $W_1$. Alternatively, machine 42 may be a flame cutter of a well-known type.

Figure 3:
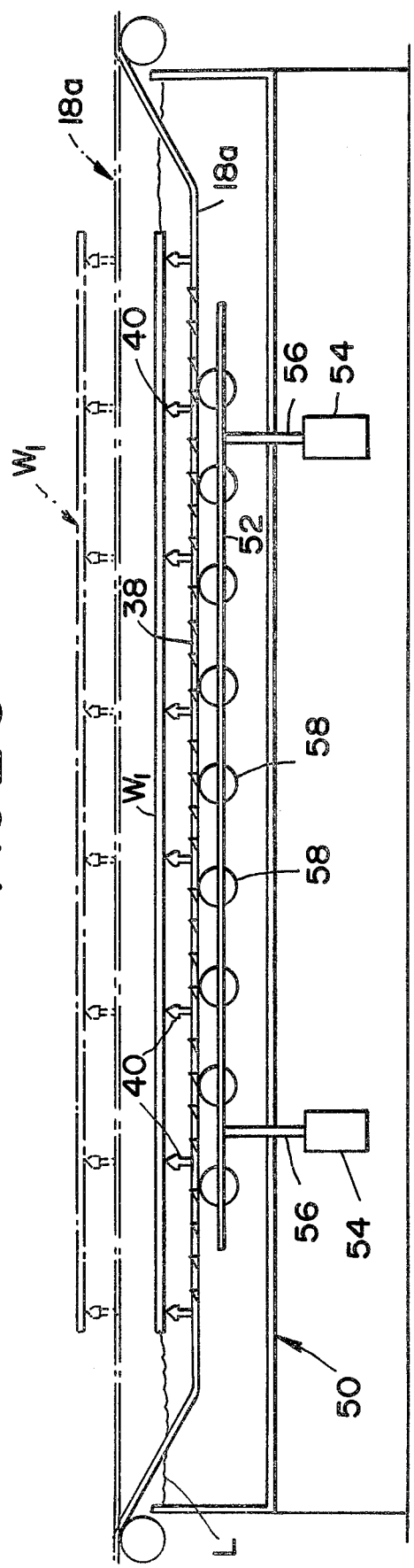
FIG. 3 is a sectional view taken along lines 3—3 of FIG. 1.
Figure 4:
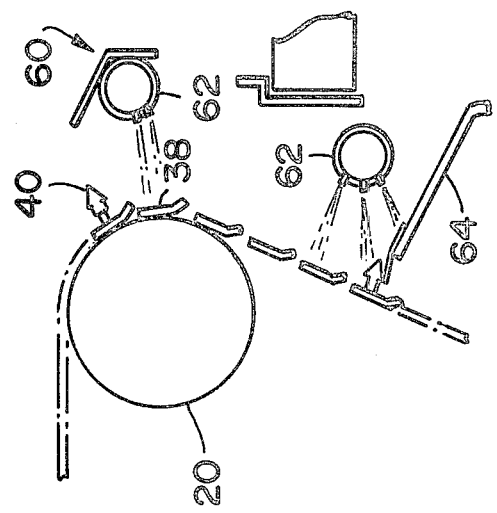
FIG. 4 is an enlarged fragmentary view of conveyor cleaning apparatus shown in FIG. 2.

The work station 14 also includes a water tank 50 which is shown more clearly in FIG. 3. The water tank 50 is filled with water to a level L to cool the workpiece $W_1$ as it is being cut by the plasma-arc machine 44. A support plate 52 in water tank 50 can be raised or lowered within the tank by a pair of hydraulic cylinders 54 and cylinder rods 56 coupled to the plate 52. Of course, sealing would be provided on the tank 50 about the areas where rods 56 penetrate into the tank 50 to prevent water from escaping. A plurality of track rollers 58 are rotatably supported by the plate 52, and support the shoes 38 of conveyor 18 as the latter traverses the tank 50.

As the workpiece $W_1$ is being cut, molten metal and iron oxide particles will fall downwardly onto the shoes 38 which, therefore, should be periodically cleaned. Consequently, as indicated in FIG. 2 and shown more clearly in FIG. 4, a cleaning apparatus 60 is employed to cleanse the conveyor 18 of unwanted material. This apparatus includes a plurality of sprayers 62 which direct a jet spray of water onto the conveyor 18 as the latter leaves the work station 14. As a result, the unwanted molten metal and iron oxides are displaced from the shoes 38 and flow down into a sluice 64 which drains and carries off the water and oxides or molten metal.

As shown in FIGS. 1 and 2, the unloading station 16 has two belt coneyors 66 and 68 which are at right angles to each other. The conveyor 66 is used to unload relatively large cut workpieces from the conveyor 18 and the conveyor 68 is used to unload relatively small cut workpieces from the conveyor 18. A removable guide plate 70 is locatable over th conveyor 68 for sliding the larger cut pieces across the gap between the conveyor 66 and the conveyor 18 to unload such pieces. The plate 70 is, for example, hinged at one end to a frame (not shown) for the conveyor 66 for positioning over or away from the conveyor 68. Thus, if the plasma-arc cutting machine 44 cuts the workpiece $W_1$ into relatively large pieces, then the guide plate 70 is put in position so that the cut workpieces can move off the conveyor 18, slide along the plate 70 and be received on the conveyor 66 for further handling. If the machine 44 cuts the workpiece $W_1$ into relatively small pieces, then the guide plate 70 is removed. As these small pieces move off the conveyor 18 along the right side thereof, they will drop off onto conveyor 68 and be carried away for further handling.

Figure 5:
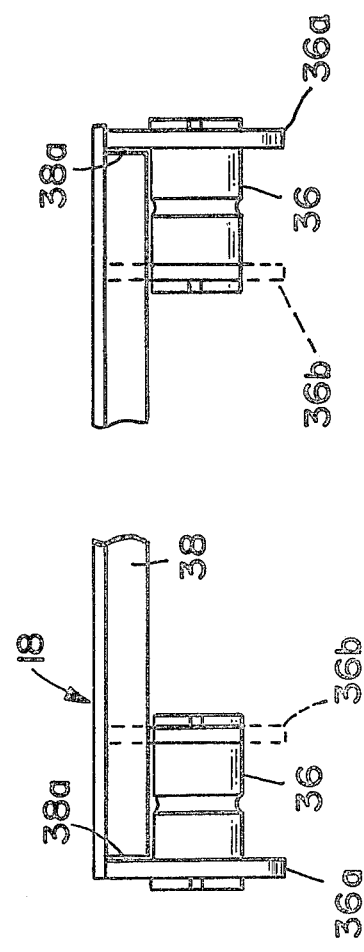
FIG. 5 is a section taken along lines 5—5 of FIG. 2.

FIG. 5 shows in more detail the carrier rollers 36 and conveyor 18, both of which have been slightly modified from the standard track and carrier rollers used on the above-mentioned earthworking equipment. Normally, the carrier rollers 36 have two flanges 36a and 36b; however, for purposes of the present invention, the inside flange 36b of the roller 36 has been cut off, leaving only the outer flange 36a, and is therefore shown in phantom. Also, the two outer edges 38a of the track shoes 38 have been cut off so that the shoes 38, as so modified, fit between the flanges 36a of the rollers 36, as shown in FIG. 5. Similarly, all the other rollers supporting or carrying the track 18, including rollers 34 and 58, are modified in the same manner as rollers 36 to provide single flanges between which the shoes 38 fit. As illustrated, the track shoes 38 ride on the flanges 36a.

INDUSTRIAL APPLICABILITY

In operation, a workpiece $W_1$ is first placed on the conveyor 18 at loading station 12. The conveyor 18 is then driven to move the workpiece $W_1$ into the work station 14. During this movement from station 12 to station 14, the conveyor 18 is fully tensioned since rod 32 is extended from the cylinder 30; also the rods 56 are extended from cylinders 54 so that the plate 52 and rollers 58 are in their raised position, thereby supporting a portion 18 of a conveyor 18 over tank 50 in a raised position as shown in the dotted lines in FIG. 3.

Then, with the workpiece $W_1$ at the work station 14, the conveyor 18 is stopped, the rod 32 is retracted into the cylinder 30 to reduce the tension on conveyor 18 and the rods 56 are retracted into cylinders 54. As a result, the plate 52 will descend in the tank 50 as will the conveyor 18 due to the decrease in tension and weight of the conveyor and workpiece, thereby lowering the portion 18a of the conveyor 18 over the tank 50 into the water. The workpiece $W_1$ also will be lowered; however, the rods 32 and 56 are retracted into their respective cylinders 30 and 54 only a preset distance so that only the bottom surface of the workpiece $W_1$ touches the surface of the water in the tank 50 at level L, as shown in full lines in FIG. 3. This bottom surface contact with the water controls distortion of the workpiece $W_1$ caused by heat generated during cutting. While the cutting operation is occurring, another workpiece $W_2$ can be placed on the conveyor 18 at the loading station 12. Then the conveyor 18 is driven to convey the cut workpiece $W_1$ onto either conveyor 66 or 68 while workpiece $W_2$ is conveyed into the work station 14 to perform the above-described cutting operation on this latter workpiece.

The installation 10 has a number of advantages which make it attractive for commercial use. A workpiece $W_1$, such as a steel plate, can be conveyed into a water tank 50, can be cut quickly and smoothly. The cut plates then can be removed from the installation 10 efficiently and with increased productivity. The conveyor 18 is made of dependable components, including shoes 38 and grouser bars 40, which have been satisfactorily used for rougher operations on earthmoving machines, thereby making conveyor 18 very capable for use in the installation 10. Furthermore, due to its simplicity, the installation 10 can be relatively easily adapted to be placed in different existing manufacturing plants, rather than having a plant being designed about the installation.

Other aspects, objects and advantages of this invention can be obtained from a study of the drawings, the disclosure and the appended claims.

What is claimed is:

1. An installation (10) for handling a workpiece ($W_1$), comprising:
    (a) a first station means (12) for loading a workpiece ($W_1$);
    (b) a second station means (14) for working on the workpiece ($W_1$) including means (42–48) for cutting the workpiece ($W_1$);
    (c) a third station means (16) for unloading the workpiece; and
    (d) means (18–24, 34, 36) for transporting the workpiece ($W_1$) from said first station means (12) to said second station means (14), including a first conveyor (18) movable in a closed loop about said first station means (12) and said second station means (14), said third station means (16) being adjacent said second station means (14) so that said first conveyor (18) delivers the workpiece ($W_1$) from said second station means (14) to said third station means (16).

2. An installation (10) according to claim 1, wherein said third station means (16) comprises:
   (a) a second conveyor (66) for receiving cut workpieces of a predetermined size;
   (b) a third conveyor (68) between said first conveyor (18) and said second conveyor (66) for receiving cut workpieces smaller than said predetermined size; and
   (c) a removable guide plate (70) for covering said third conveyor (68) so that the cut workpieces of said predetermined size are transported to said second conveyor.

3. An installation (10) for handling a workpiece ($W_1$), comprising:
   (a) a first station means (12) for loading a workpiece ($W_1$);
   (b) a second station means (14) for working on the workpiece ($W_1$);
   (c) a third station means (16) for unloading the workpiece;
   (d) means (18-24, 34, 36) for transporting the workpiece ($W_1$) from said first station means (12) to said second station means (14), including a first conveyor (18) movable in a closed loop about said first sation means (12) and said second station means (14), said third station means (16) being adjacent said second station means (14) so that said first conveyor (18) delivers the workpiece ($W_1$) from said second station means (14) to said third station means (16), wherein said second station means includes a water tank (50) for receiving said first conveyor (18) and the workpiece ($W_1$); and
   (e) means (26-32) for lowering said first conveyor (18) into said water tank (50).

4. An installation (10) according to claim 3 wherein said means for lowering comprises means (26-32) for adjusting the tension on said first conveyor (18).

5. An installation (10) according to claim 4, wherein said second station means (14) comprises:
   (a) means (52, 58) for supporting said first conveyor (18) in said water tank (50); and
   (b) means (54, 56) for raising said supporting means, whereby the tension on said first conveyor (18) can be increased by said adjusting means (26-30) as said conveyor (18) is being raised by said raising means (54, 56).

6. An installation (10) according to claim 5, wherein said tension adjusting means (26-30) is at said first station means (12) and comprises:
   (a) a pivotable idler roller (24) about which said conveyor (18) moves; and
   (b) means (26-32) is pivoting said idler roller.

7. An installation (10) for handling a workpiece ($W_1$), comprising:
   (a) a first station (12) at which the workpiece ($W_1$) is loaded;
   (b) a second station (14) for receiving the loaded workpiece, including means (42) for cutting the workpiece, a water tank (50) for receiving the workpiece, support means (52, 58) movable in said water tank, and means (54, 56) for raising and lowering said support means;
   (c) a first conveyor (18), movable in a closed loop about said first station (12) and said second station (14) and supported at least partially by said support means, (52, 58) for carrying the workpiece, said first station (12) including means (24-32) for adjusting the tension on said first conveyor (18) so that said first conveyor can be lowered into said water tank when said support means is lowered in said water tank; and
   (d) a third station (16) for receiving the cut workpiece from said second station.

8. An installation (10) according to claim 7, wherein said first conveyor comprises a plurality of shoes (38) coupled to one another, and spaced-apart grouser bars (40) extending from said shoes and supporting the workpiece, said shoes receiving slag resulting from cutting the workpiece.

9. An installation (10) according to claim 8, wherein said second station comprises means (60, 62, 64) for cleaning the slag from said work shoes (38).

10. An installation (10) according to claim 9, wherein said means for cleaning includes a plurality of jets (62) for spraying cleaning water on said first conveyor (18), and a sluice (64) for receiving cleaning water reflected from said first conveyor (18).

11. An installation (10) according to claim 7, wherein said means (42) for cutting includes a gantry (48), and a cutting apparatus (44) movably supported on said gantry (48), said cutting apparatus being movable to be positioned for cutting the workpiece.

12. An installation (10) according to claim 11, wherein said cutting apparatus (44) is a plasma-arc cutter.

13. An installation (10) according to claim 11, wherein said cutting apparatus (44) is a flame cutter.

14. An installation (10) according to claim 7, wherein said movable support means (52, 58) comprises a plurality of rollers (58) on either side of said first conveyor (18) and in rolling contact with said first conveyor.

15. An installation (10) according to claim 14, wherein said rollers (58) have single flanges (36a) on the outside thereof.

16. An installation (10) according to claim 7, wherein said means (54, 56) for raising and lowering includes a hydraulic lifting means (54, 56) connected to said support means (52, 58) and which allows said support means (52, 58) to be lowered into said water tank (50) to cut the workpiece and which lifts said support means (52, 58) after the workpiece is cut.

17. An installation (10) according to claim 7, wherein said means (24-32) for adjusting includes, at said first station (12), a pivotally mounted idler roller (24) about which said first conveyor (18) moves, and means (26-32) for pivoting said idler roller (24) to increase or decrease the tension on said first conveyor (18).

18. An installation (10) according to claim 7, wherein said third station (16) comprises:
   (a) a second conveyor (66) for receiving cut workpieces of a predetermined size;
   (b) a third conveyor (68), coupled between said first conveyor (18) and said second conveyor (66), for receiving cut workpieces smaller than said predetermined size; and
   (c) a guide plate (70), removably located over said third conveyor (68), for guiding the cut workpieces of predetermined size from said first conveyor (18) to said second conveyor (66).

19. A method of handling workpieces, comprising:
   (a) loading one of the workpieces ($W_1$) on a conveyor (18) at a first station (12);
   (b) moving the conveyor (18) to transport the one workpiece to a second station (14);
   (c) stopping the conveyor (18) when the one workpiece is at the second station (14);
   (d) lowering a portion (18a) of the conveyor at the second station (14) into a water tank (50);
   (e) moving a tool (44) over the one workpiece and operating on the workpiece with the tool (44);
   (f) removing the tool (44) from the one workpiece after operating on the one workpiece;
   (g) raising the portion (18a) of the conveyor (18) out of the water tank after operating on the workpiece;
   (h) loading another workpiece ($W_2$) on the conveyor (18) at the first station (12) when the one workpiece is at the second station (14); and
   (i) moving the conveyor (18) to transport the one workpiece operated on to a third station (16) while transporting the other workpiece to the second station (14).

20. A method according to claim 19, wherein the step of lowering comprises reducing the tension on the conveyor (18) to allow the portion of the conveyor (18) over the water tank (50) to descend into the water tank (50).

21. A method according to claim 20, wherein the step of reducing the tension comprises reducing the tension so that only the bottom surface of the workpiece contacts water in the water tank (50).

22. A method according to claim 19, wherein the step of raising comprises pushing the portion of the conveyor (18) in the water tank (50) upwards while increasing tension on the conveyor (18).

23. A method according to claim 19, wherein the step of operating on the workpiece comprises cutting the workpiece.

24. A method according to claim 23, wherein the step of cutting is plasma-arc cutting.

25. A method according to claim 23, wherein the step of cutting is flame cutting.

26. A method according to claim 19, comprising, at the third station (16), the step of removing workpieces operated on to one of two locations (66, 68) depending on the size of the workpieces operated on.

27. A method according to claim 19, further comprising cleaning the conveyor (18) of slag after the conveyor passes through the water tank (50).

* * * * *